W. H. COLLINS.
TRAP FOR HENS' NESTS.
APPLICATION FILED NOV. 26, 1912.

1,139,849.

Patented May 18, 1915.
2 SHEETS—SHEET 1.

Witnesses
R. F. Maryman
C. C. Hines

Inventor
Wm. H. Collins.
By Victor J. Evans
Attorney

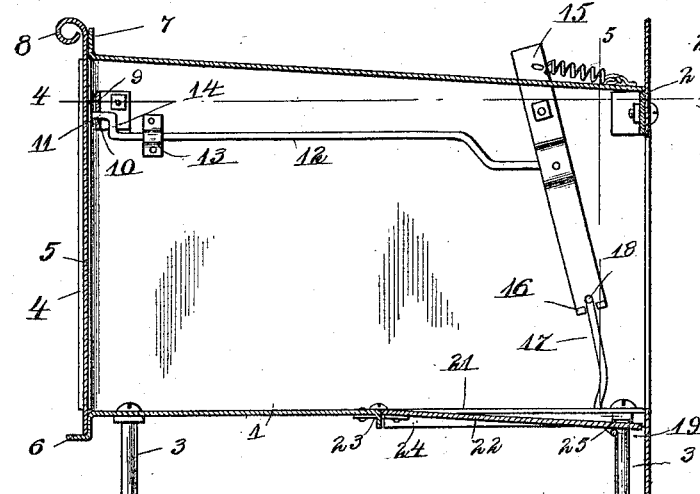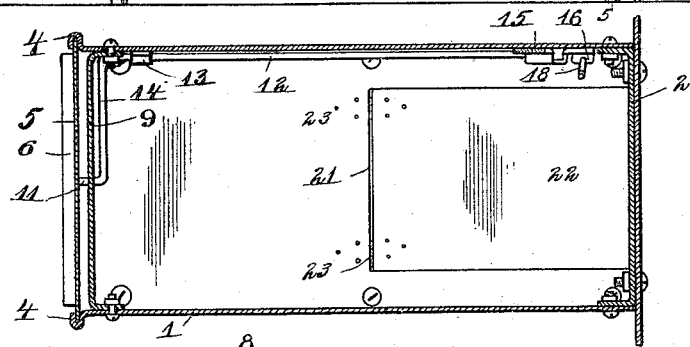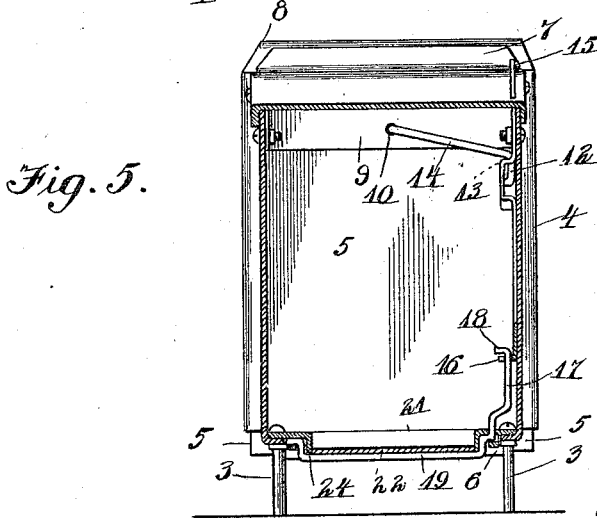

UNITED STATES PATENT OFFICE.

WILLIAM H. COLLINS, OF MERIDEN, CONNECTICUT.

TRAP FOR HENS' NESTS.

1,139,849.          Specification of Letters Patent.     Patented May 18, 1915.

Application filed November 26, 1912. Serial No. 733,695.

*To all whom it may concern:*

Be it known that I, WILLIAM H. COLLINS, a citizen of the United States, residing at Meriden, in the county of New Haven and State of Connecticut, have invented new and useful Improvements in Traps for Hens' Nests, of which the following is a specification.

This invention relates to traps for hens' nests, the object of the invention being to provide a device of this character which is adapted to be attached to any ordinary nest in line with the door therein, and which will be automatically operated by the passage of the fowl into the nest to confine the fowl until released.

A further object of the invention is to provide a trap for hens' nests which is simple of construction, efficient in operation, adapted for use without injury to the passing fowl, and capable of being reset for use after actuation in an easy and convenient manner.

A still further object of the invention is to provide a trap of the character described which, if desired, may be made of the knockdown or collapsible type, and which embodies automatic means for resetting the door latch mechanism when the door is opened.

The invention consists of the features of construction, combination and arrangement of parts hereinafter fully described and claimed, reference being had to the accompanying drawings in which:—

Figure 1:
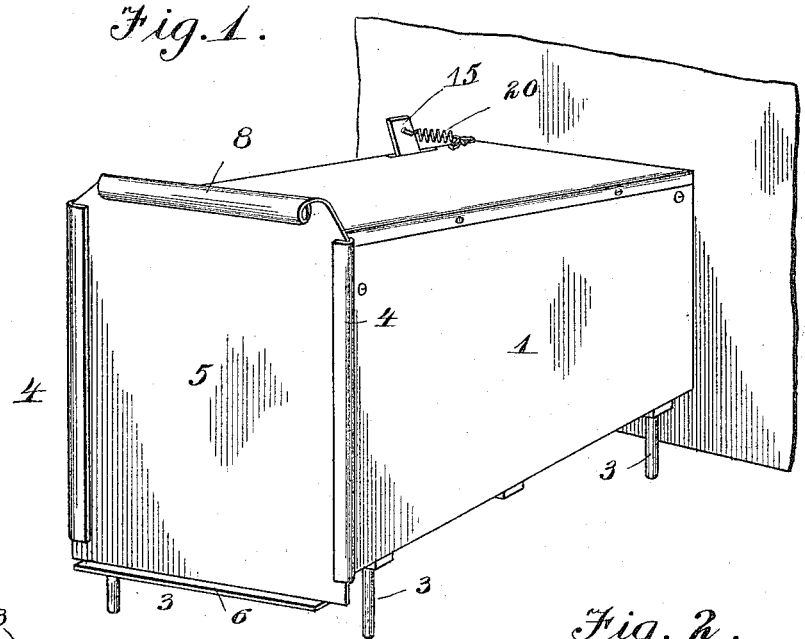
Figure 2:
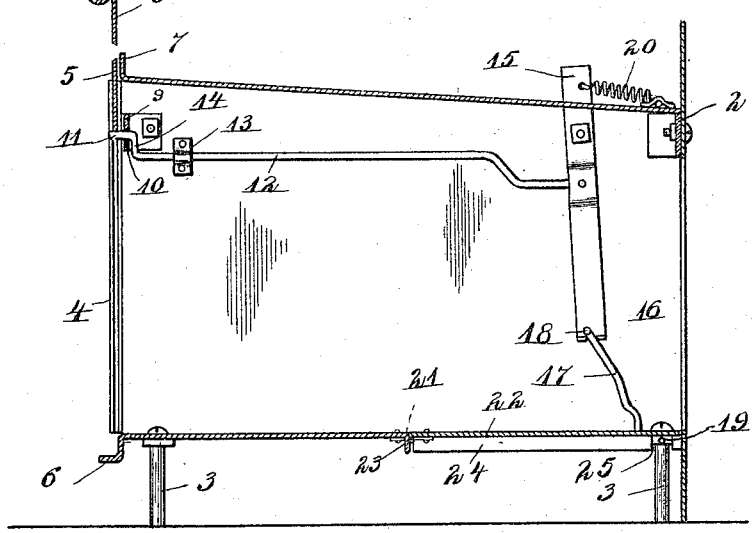

Figure 1 is a perspective view showing the device applied to a hen's nest, a portion of the latter only being shown. Fig. 2 is a vertical longitudinal section through the trap, showing the door in raised position. Fig. 3 is a similar view showing the position of the parts when the door is dropped to entrap the hen. Fig. 4 is a sectional plan view on the line 4—4 of Fig. 3. Fig. 5 is a vertical transverse section on the line 5—5 of Fig. 3.

Referring to the drawings, 1 designates the trap casing, which may be made of sheet metal or other suitable material, and which may be of the folding, knock-down or collapsible type, if desired. In the present instance, I have shown a non-collapsible trap, as any known mode of constructing the casing for a folding or collapsing action may be employed.

The top wall of the casing is preferably inclined downwardly and rearwardly to form a water shed, and the casing is provided at its rear end, which is designed to register with the doorway of the nest, with an upper cross piece 2 perforated for the passage of fastenings, whereby said casing may be secured to the nest. The casing, if desired, may be provided with suitable pendent supports or legs 3.

The open front of the casing forms a doorway which is provided at its sides with guide flanges 4 in which is slidably fitted a vertically movable door 5. The bottom wall of the casing is formed with a stop flange 6 to limit the downward movement of the door, while the top wall of the casing is provided with a flange 7 adapted to sustain the door against rearward deflection when elevated. The door is provided at its upper edge with a finger grip 8, which may be of any suitable construction.

Secured to the side walls of the casing adjacent the doorway therein is a cross piece 9 having an opening 10 therein to receive a latch pin 11 against which the lower edge of the door, when raised, is adapted to rest to hold the door open. This latch pin is formed by the forward end of a longitudinally sliding latch rod 12 movable in a guide 13 secured to one of the side walls of the casing and connected at its forward portion to the latch pin by a right angularly bent arm 14.

The rear end of the sliding latch rod 12 is bent downwardly at an angle and pivotally connected with a setting lever 15, which lever is pivotally supported for movement longitudinally of the casing, and has an angularly bent and slotted or bifurcated lower end 16 slidably and pivotally engaging a rocker arm 17 bent at its upper end to provide a detent 18 whereby the degree of swinging movement of the lever is regulated.

The rocker arm 17 is secured to or forms part of one end of a rock shaft 19 journaled in suitable bearings upon the under side of the bottom wall of the casing adjacent the inner end thereof, which rock shaft forms a depressible trip device adapted when depressed to rock the arm 17 rearwardly and thus swing the setting lever rearwardly to slide the latch bar in such direction, and thus retract the latch pin to permit the elevated door to drop. The upper end of the lever projects exteriorly of the casing, so that it may be manually engaged and swung in the opposite direction to raise the rock shaft and restore the latch pin to latching position, as will be readily understood. If desired, however, a spring 20 may be provided to connect the lever with an adjacent portion of the casing, so as to operate to normally hold the parts in set position, so as to provide for the automatic projection or resetting of the latch pin to engage under the door, when the latter is raised from a closed to an open position.

The bottom of the trap casing is provided with an opening 21 adapted to be closed by a vertically movable trip plate or platform 22 connected at its outer or forward edge to said bottom wall of the casing by hinges or pivots 23, of a type adapted to hold the plate against depression under its own weight when raised, while permitting it to be readily depressed by a passing fowl. The plate when depressed comes in contact with and depresses the rock shaft, thus transferring motion to the latch mechanism to withdraw the latch and permit the door to close, whereby the hen will be entrapped or confined within the nest until the door is opened. Preferably the side walls of the opening 20 are formed with downwardly bent flanges 24 having recesses 25 to receive the shaft when elevated, so as to guide said shaft in its movements and prevent it from being strained or bent when in position to be tripped.

From the foregoing description, taken in connection with the drawings, the construction and mode of use of the device will be obvious, and it will be seen that the invention provides a trap which may be secured to any ordinary nest, and which consists of comparatively few parts liable to get out of order, so that efficiency of operation is insured.

I claim:—

A trap for hens' nests comprising a sheet metal casing open at its inner end and having guideways at its outer end and a slot in its bottom, said bottom having depending flanges at the sides and forward end of said slot, a self-dropping door slidably mounted in said guides, a cross piece adjacent the doorway having a guide opening therein, a depressible platform within the opening in the bottom of the casing, said platform being pivoted at its forward edge to the said forward flange and guided for movement between said side flanges, a rock shaft journaled upon the bottom of the casing and having a crank portion extending transversely of the slot beneath said side flanges and provided at one end with a crank arm projecting upwardly into the casing, an intermedially pivoted lever mounted upon the interior of the casing at one side thereof, said lever having a lower long arm provided with an angularly bent and forked portion extending inwardly therefrom and slidably and pivotally engaging said crank arm and having an upper short arm projecting exteriorly through the top of the casing, a guide member upon the adjacent side of the casing, a locking rod slidable through said guide member and pivoted at its inner end to the lower arm of the lever between said forked portion and the pivot point of the lever, said rod having an angularly bent outer end forming a detent movable through said guide opening in the cross bar, and a spring connecting the short arm of the lever with the casing and acting on said lever to hold the platform normally elevated and the locking rod normally projected.

In testimony whereof I affix my signature in presence of two witnesses.

WILLIAM H. COLLINS.

Witnesses:
 GEORGE E. MAY,
 JOHN J. NASH.

Copies of this patent may be obtained for five cents each, by addressing the "Commissioner of Patents, Washington, D. C."